United States Patent [19]

Ozaki et al.

[11] Patent Number: 4,713,686

[45] Date of Patent: Dec. 15, 1987

[54] HIGH SPEED INSTANTANEOUS MULTI-IMAGE RECORDER

[75] Inventors: Haruhiko Ozaki; Tadatoshi Yamada; Kunio Machida; Kiyoshi Ohno; Hirato Shimazaki, all of Tokyo; Hidekimi Inoue, Saitama; Ryohei Uji, Tokyo, all of Japan

[73] Assignee: Bridgestone Corporation, Tokyo, Japan

[21] Appl. No.: 880,269

[22] Filed: Jun. 30, 1986

[30] Foreign Application Priority Data

Jul. 2, 1985 [JP] Japan ................................ 61-36762
Dec. 10, 1985 [JP] Japan ................................ 60-277331

[51] Int. Cl.⁴ ............................................ H04N 7/18
[52] U.S. Cl. ................................. 358/107; 358/93; 358/105; 434/252; 434/369; 354/416; 352/121
[58] Field of Search .................. 358/93, 107, 105, 83; 434/369, 252; 354/410, 413, 416; 352/121

[56] References Cited

U.S. PATENT DOCUMENTS

| | | | |
|---|---|---|---|
| 2,223,849 | 12/1940 | Fozler et al. | 434/252 |
| 3,016,812 | 1/1962 | Chatlain | 358/108 |
| 3,577,153 | 5/1971 | Yazi et al. | 358/93 |
| 4,005,261 | 1/1977 | Sato et al. | 358/83 |
| 4,158,853 | 6/1979 | Sullivan et al. | 358/93 |
| 4,163,941 | 8/1979 | Linn, Jr. | 358/107 |
| 4,168,510 | 9/1979 | Kaiser | 358/183 |

Primary Examiner—Howard W. Britton
Assistant Examiner—John K. Peng
Attorney, Agent, or Firm—Jordan and Hamburg

[57] ABSTRACT

This high speed, instantaneous multi-image recorder comprises a video camera, sensor unit and light projector. A frame memory is connected to the video camera, a flashtube is to the light projector, a retarder is to the sensor unit. The flashtube is connected to the retarder, and a monitor is connected to the frame memory. The video camera, sensor unit and light projected are placed as directed toward a moving object which is, for example, a golf club. When the golfer swings the club, the sensor unit detects the club, the light projector flashes, and the video camera picks up the golf ball and club head around the moment of impacting. Thus, the video camera catches many instantaneous poses within a frame. Many such images picked up in a signal frame of the video camera are displayed on the monitor screen for analysis.

3 Claims, 8 Drawing Figures

HIGH SPEED INSTANTANEOUS MULTI-IMAGE RECORDER

BACKGROUND OF THE INVENTION

1. Field of the Invention

This invention relates to a high speed instantaneous multi-image recorder for recording within one frame a plurality of images of a moving object, e.g. a ball or a club in the vicinity of their impact, when a golf club is swung and for reproducing the recorded frame on a monitor as a still image at the moment of a driving or analyzing the velocity and the spin of a ball just after it has been driven with a racket of tennis or pingpong.

2. Description of the Prior Art

Heretofore, as this kind of devices, there are known a high speed video camera, which can produce more than 500 frames per second, and a device using a stroboscope.

However, by means of a prior art high speed video camera it was not possible to record a plurality of still images within a frame. Therefore, when it was desired to know state variations in the vicinity of an impact, it was necessary to repeat frame feeding or search and thus its handling was complicated. Further, for the high speed video camera, not only special illumination was necessary, but also it has an inconvenience that unnecessary images were recorded. Still further, it was not possible to look any images recorded by means of a stroboscope in real time.

SUMMARY OF THE INVENTION

The object of this invention is to provide a high-speed instantaneous multi-image recorder, which records a plurality of images of a moving object within a frame at a desired instance without any unnecessary images and as the result, makes frame feeding or search needed by a prior art video recorder unnecessary so that it is possible to look only at necessary images in real time.

In order to achieve the object described above, a high speed instantaneous multi-image recorder according to this invention comprises at least one video camera, a sensor and a light emitting portion located so as to be directed towards a moving object, a frame memory connected to the video camera, which frame memory receives image signals of this video camera and sends for one frame to a monitor in synchronism with an external signal; a strobo connected to the light emitting portion and giving it a lightening output for producing a plurality of flashes for one frame of the video camera; and a retarder connected to the sensor and receiving detection signals coming from the sensor, the strobo receiving lightening signals coming from the retarder being connected also to the retarder, whereby the frame memory is connected to another strobo, which frame memory receives synchronization signals coming from the strobo and is synchronized with flashes emitted by the light emitting portion through the other retarder so that a plurality of instantaneous poses illuminated by a plurality of flashes of the light emitting portion within one frame of the video camera are displayed at the same time on the monitor.

DESCRIPTION OF THE PREFERRED EMBODIMENTS

Figure 1:
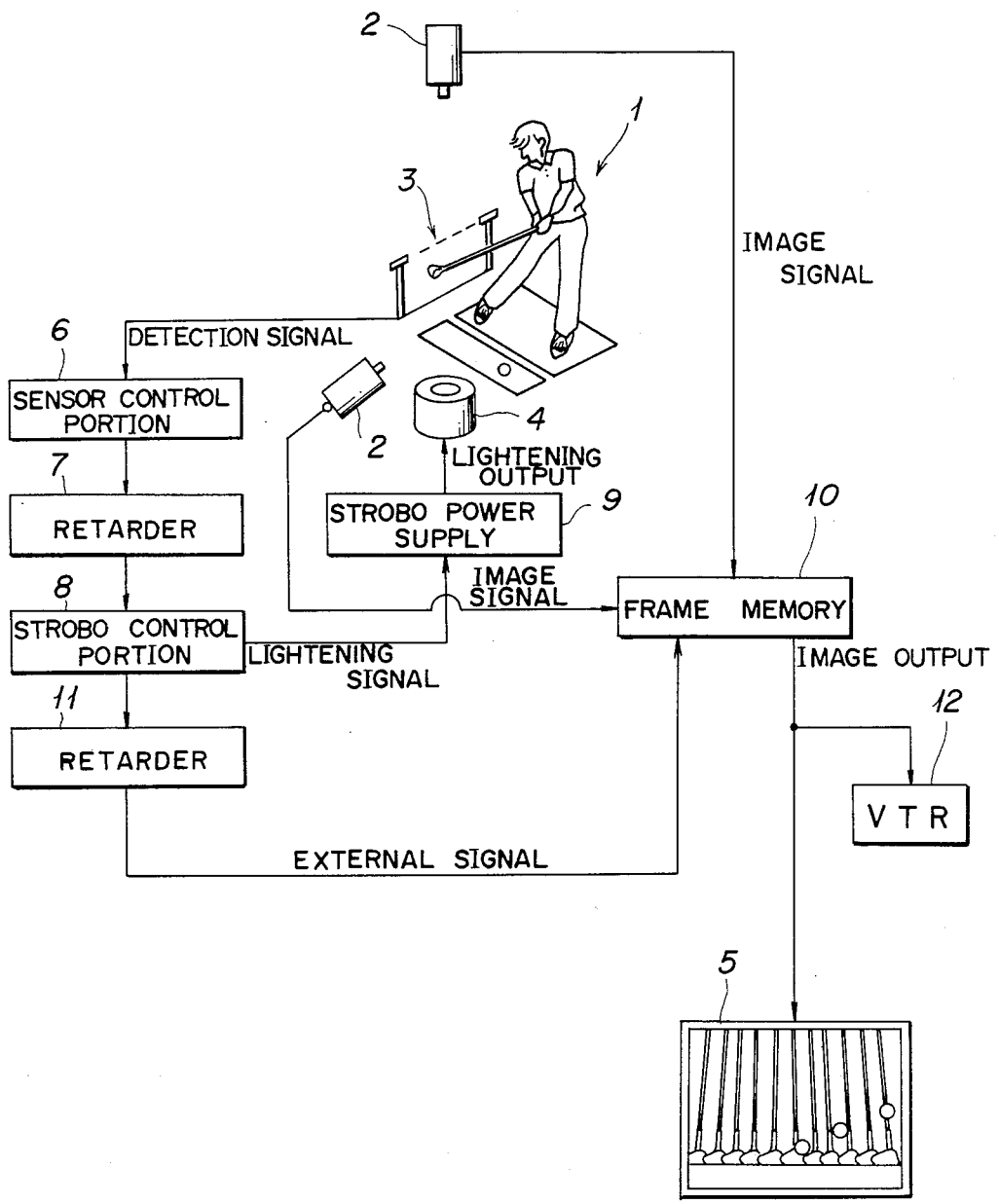
FIG. 1 is a block diagram of the whole recorder illustrating an embodiment for recording a golf club at the moment of its impact.
Figure 2:
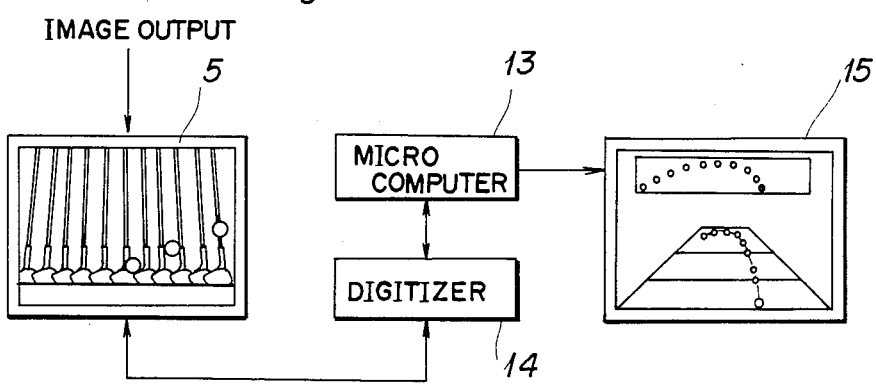
FIG. 2 is a scheme for explaining the connection of the monitor to a microcomputer.

In FIG. 1 two video cameras 2, a sensor 3 and a light emitting portion 4 are located so as to be directed towards a moving object 1. The video camera 2 may be one usually sold on the market, which sends image signals at a speed of 30 frames per second and it is not necessarily a special high speed video camera. When a golf club is swung down, the sensor 3 is actuated and sends a detection signal to a sensor control portion 6. The signal sent by the sensor control portion 6 is received by a retarder 7 and the signal from the retarder 7 is sent to a strobo control portion 8. The strobo control portion 8, which has received the signal from the retarder 7, sends a lightening signal to a strobo power supply 9, which gives the light emitting portion 4 a lightening signal. The light emitting portion 4, which has received the lightening output, emits a plurality of flashes within one frame of the video camera 2, which catches a plurality of instantaneous poses. For example, when a camera usually sold on the market, which sends 30 frames per second, is used as the video camera 2 and operated for one frame, the light emitting portion 4 emits ten flashes in 1/30 second. The video camera 2 catches ten instantaneous poses within one frame and a monitor 5 displays the ten instantaneous poses in the form of a multi-image in real time on a monitor 5. The two video cameras 2 are set in front of and above the moving object 1, respectively, which send their respective image signals to a frame memory 10. The strobo control portion 8 outputs a lightening signal to the strobo power supply 9 and at the same time a signal to a retarder 11, which, in turn, outputs an external signal to the frame memory 10. When the frame memory 10 receives the signal from the strobo control portion 8 through the retarder 11, it outputs image signals coming from the video cameras 2 and stored therein to a monitor 5. The monitor 5 displays at the same time the plurality of instantaneous poses caught by the plurality of flashes emitted by the light emitting portion 4 within one frame of the video camera 2 as a multi-image. Further, the frame memory 10 sends the image output to a video tape recorder (VTR) 12 at the same time as the image output to the monitor 5 so that the image output is recorded in the VTR 12. Furthermore, the position of the ball and that of the club in the image desplayed by the monitor 5 are represented in a coordinate by using a digitizer 14 by means of a microcomputer 3 and the initial speed, the back spin and the side spin of the driven ball, the vertical drive angle, the horizontal drive angle, the drive direction of the head (inside-out, outside-in, etc.), scores, etc. are expressed numerically. In addition, it is also possible to calculate the trajectory and the flight distance of the ball by using initial conditions and to display them on the screen of a CRT 5. The retarders 7 and 11 retard sending out of the signal to their succeeding stage by a certain time. The retarder 7 regulates the timing for recording a multi-image of a ball and a club within one image. This is necessary, because the time from the moment the golf club passes through the sensor 3 to the instance of the impact of the golf swing varies depending on the player and the club number. On the other hand the retarder 11 regulates the timing between the strobo lightening and the recording of the image so as to image multiply the ball and the club within one frame. The light emitting portion 4 is so constructed that 10 flashes are emitted successively with an interval of 2/1000 second. In addition, in the case where a microcomputer 13 is used, it is possible also to store results of the calculation in an external memory device.

Although an example, in which two video cameras 2 are used, is shown in FIG. 1, it is possible also to set only one or more than three cameras in order to obtain images with different angles. For example, when they image the object frontally, aslant and downward, the state of the club and the ball, the posture of the player, etc. can be better seen. In addition, not only by imaging the golf club at the instant of the impact but also by imaging various sorts of collision phenomena it is possible to analyze easily the velocity and the spin state.

Figure 3:
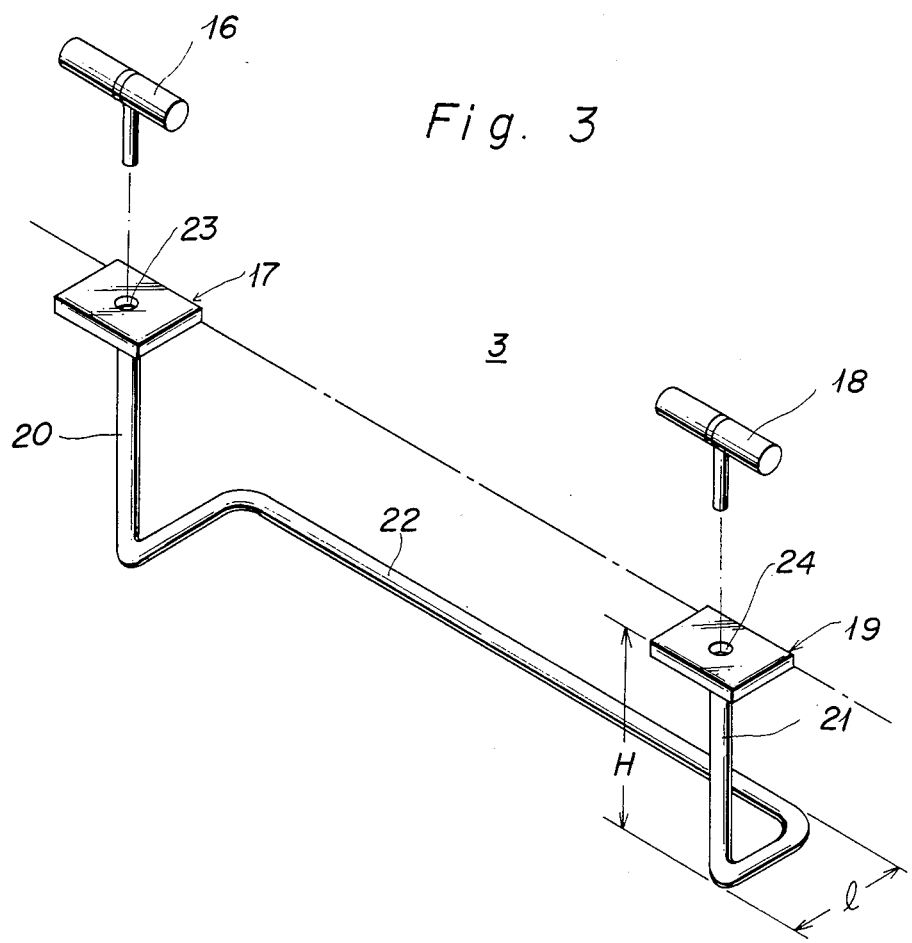
FIG. 3 is a perspective view showing an example of sensor devices.

The sensor 3 is provided with a first bracket 17, on which a projector 16 is mounted, and a second bracket 19, on which a reciver 18 is mounted. The brackets 17 and 19 have a first and a second support 20, 21, respectively, having a predetermined height, and the lower extremities of the supports 20 and 21 are bent and connected with each other through a connecting support 22 as indicated in Fig. 3. Mounting holes 23 and 24 made in the brackets 17 and 19, respectively, are so formed that they are on one horizontal line. The first and the second support 20, 21 are made of a round steel pipe or an aluminum pipe and welded to the connecting support 22 made of the same material as the supporter 20, 21. The length 1 of the horizontal portion of each of the supports 20, 21 is about 300 mm and their height H is about 500 mm. The supporters 20 and 21 are so distant that they don't hinder the golf swing and the distance therebetween is about 1800 mm. In addition, the brackets 17 and 19 are so constructed that their height and their position in a horizontal plane can be readjusted by about ±0.5 mm.

Remarkable waste of time for the alignment of the optical axis of the projector and the receiver mounted on two independent supporters is saved by using a sensor 3 thus constructed. That is, for such a sensor 3, since the distance between the first and the second bracket is kept to be constant by the connecting supporter and their height is also predetermined, the alignment of their optical axis can be effected easily.

When the golf club traverses the line connecting the projector 16 and the receiver 18 constituting the sensor 3, it sends a detection signal to the sensor control portion 6. It is desirable that this detection signal is transmitted only at the moment of a down swing of a golf club and that it is not transmitted at the moment of a back swing. For this reason the sensor 3 should be directive or when it is not directive, it can be so constructed that the detection signal is transmitted, only when the golf club traverses twice the line connecting the projector 16 and the receiver 18.

Figure 4A:
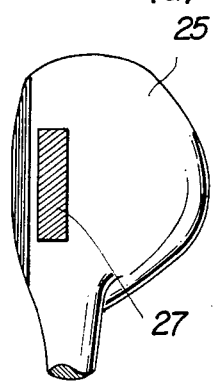
FIG. 4(a), (b) and (c) illustrate the head and the shaft of an elaborated golf club.
Figure 4B:
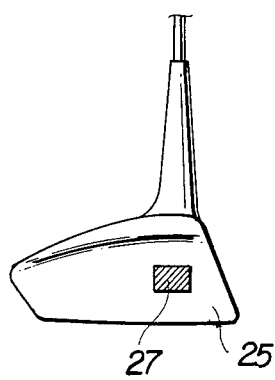
Figure 4C:
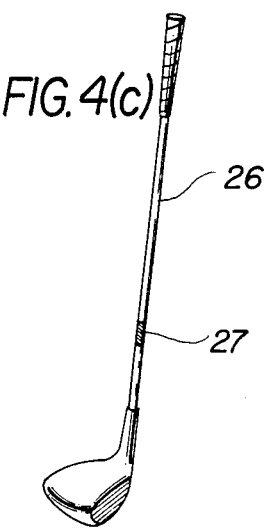

On the golf club indicated in FIGS. 4(a)-(c) is stuck a white or reflective tape 27 permitting the obtaining of a clear image of the trajectory of the head or the movement of the shaft 26. Owing to this tape, flash light emitted by the light emitting portion 4 is reflected and thus it is possible to image specifically clearly the position of the tape 27. Further, the whole golf club may be painted white.

In addition, such a reflective tape 27 may be stuck on the ball, too. If a black cross is marked on the ball, trajectory analysis can be effected more easily.

Figure 5:
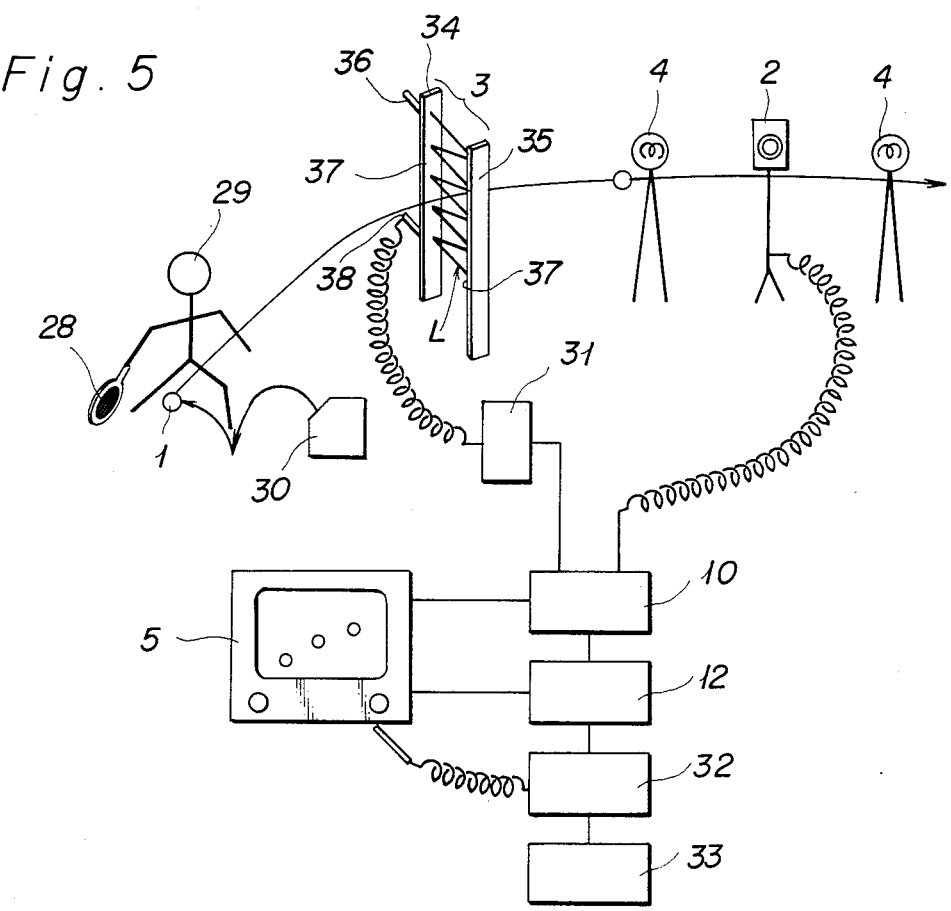
FIG. 5 is a block diagram illustrating the whole construction of a recorder in an embodiment for recording a tennis play at the inotance of an impact.
Figure 6:
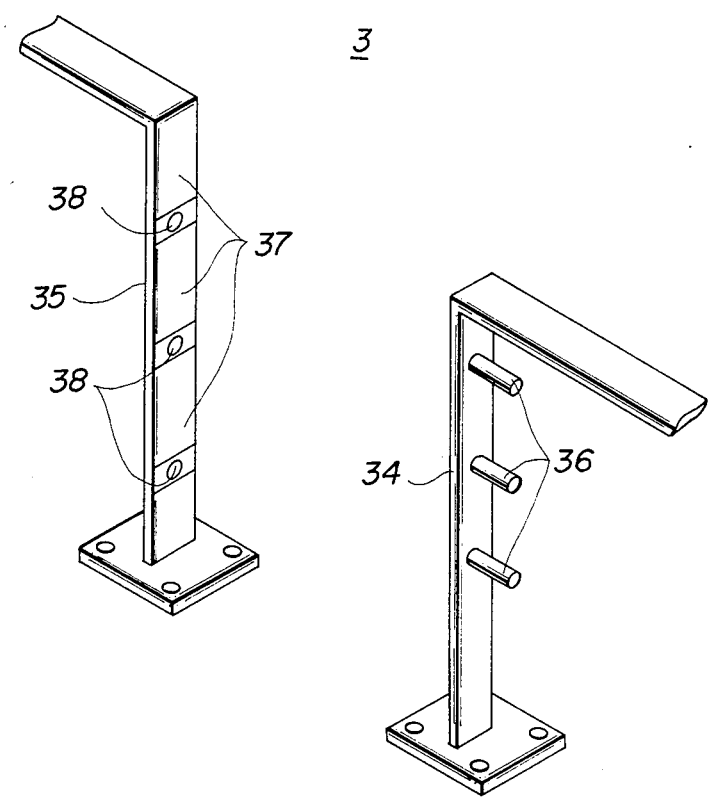
FIG. 6 is a perspective view illustrating the sensor indicated in FIG. 5.

FIG. 5 indicate schematically a device for analyzing the velocity and the spin of a tennis ball (moving object 1), just after it has been driven by a player 29 with a racket 28, the basic structure of which is identical to that indicated in FIG. 1. Reference numeral 30, 31, 32 and 33 represent a ball projecting machine, a retarder, a write pen and a personal computer. In this device the sensor 3 is so constructed that it is actuated, when a moving object (tennis ball) 1 passes through a space having a certain area. This sensor 3 will be explained below more in detail. Two standing walls 34, 35 are spaced a certain distance. On the surfaces opposing to each other of both the standing walls 34 and 35 are disposed mirrors 37 reflecting laser light emitted by a laser light emitting portion 36 and laser light reflected by the mirrors 37 is received by a light receiving portion 38. For example, in FIG. 5, the laser light is emitted from the left upper part towards the mirror 37 on the standing wall 35 (slightly downward) and repeatedly reflected by the mirrors 37 at the left and right side so that a laser light plane (indicated by L in FIG. 5) is formed between the mirrors 37. In the example indicated in FIG. 6 three laser light emitting portions 36 and three light receiving portions 38 are disposed so that attenuation of the laser light reflected successively is prevented. When a tennis ball traverses this laser light plane, the same effect as that explained referring to FIG. 1 is produced and a multi-image of the tennis ball can be made within one frame. It is obvious that the same effect can be obtained, when the laser light is reflected successively along the standing walls 34, 35 opposing to each other not from the top to the bottom but from the bottom to the top. It is desirable that the distance between the two mirrors 37 is greater than 1000 mm and that the distance two laser beams adjacent to each other above and below due to the repetition of the reflection is smaller than 65 mm. This sensor 3 can be called a plane trigger and by using such a plane trigger it is possible to make a multi-image of a ball used for base ball, pingpong, rugby, soccer, and other ball games. In addition, it is possible also to make a multi-image illustrating movement of a human body in judo, etc. Further, in FIG. 5, the retarders 7, 11 and the strobo power supply 9 are not indicated but it is of course obvious that they are used.

When the recorder described above is used, analysis of moving objects can be effected easily. Further, differently from the prior art stroboscopic photography, still images can be made in a bright environment. In addition, since a plurality of instantaneous poses can be recorded within one frame, no unnecessary images are recorded by nature, what makes the recorder according to this invention economical.

What is claimed is:

1. A high speed instantaneous multi-image recorder comprising:
    at least one video camera, a sensor and a light emitting portion located so as to be directed towards a moving object;

a frame memory connected to said video camera to receive image signals from said video camera and connected to send images for one frame to a monitor in synchronism with an external signal;

a strobo arrangement connected to said light emitting portion and actuating it to produce a plurality of flashes for one frame of the video camera;

a first retarder connected to said sensor to receive detection signals coming from the sensor, the strobo arrangement being connected to receive signals from the first retarder; and a second retarder connected to said strobo system for producing said external signal;

said frame memory being connected to receive said external signal from a second retarder, whereby said frame memory is synchronized with flashes emitted by said light emitting portion via said second retarder so that a plurality of instantaneous poses illuminated by a plurality of flashes of said light emitting portion within one frame of the video camera are displayed at the same time on said monitor.

2. A high speed instantaneous multi-image recorder according to claim 1, wherein said sensor is so constructed that it is actuated when a moving object passes through a predetermined space having a certain area.

3. A high speed instantaneous multi-image recorder according to Claim 1, wherein said sensor is comprised of a projector and a receiver positioned to receive a light beam emitted by said projector so that it produces a signal when an object traverses said light beam between the projector and the receiver;

said projector being mounted on a first bracket supported by a first supporter at a predetermined height, said receiver being mounted on a second bracket supported by a second supporter at the predetermined height;

said first supporter and said second supporter being connected to each other through a connecting supporter.

* * * * *